United States Patent

[11] 3,586,920

| [72] | Inventors | Hisato Wakamatsu;<br>Noriyoshi Ando, both of Kariya-shi, Japan |
|---|---|---|
| [21] | Appl. No. | 830,403 |
| [22] | Filed | June 4, 1969 |
| [45] | Patented | June 22, 1971 |
| [73] | Assignee | Nippon Denso Company Limited<br>Kariya-shi, Japan |
| [32] | Priority | June 6, 1968 |
| [33] | | Japan |
| [31] | | 43/38877 |

[54] AUTOMOBILE CLUTCH DISENGAGING APPARATUS
6 Claims, 2 Drawing Figs.

[52] U.S. Cl. .................................................. 317/148.5,
317/154, 192/.055, 192/13
[51] Int. Cl. ...................................................... H01h 47/32
[50] Field of Search............................................ 317/148.5,
154; 307/115, 142, 255; 192/.055, 13

[56] References Cited
UNITED STATES PATENTS
3,480,839 11/1969 Johansson..................... 317/154 X Primary Examiner—Lee T. Hix
Attorney—Cushman, Darby & Cushman ABSTRACT: An automobile clutch disengaging apparatus comprising a first switch means adapted to be opened and closed in accordance with a lubricating oil pressure in the engine, a brake switch adapted to be opened and closed by the operation of a brake means, a second switch means adapted to be operated upon closure of said brake switch and said first switch means to permit power supply to a clutch disengaging solenoid, a holding circuit adapted to be operated upon closure of said second switch means to hold the latter in the closed state, and a third switch means for forcibly stopping the operation of said holding circuit, said second switch means including a self-holding circuit which is established by the fact that a current is caused to flow through said clutch disengaging solenoid. With this apparatus, the clutch is disengaged to cut off the connection between the wheels and the engine of a vehicle immediately when the engine is stopped as a result of the fact that the wheels are stopped from rotating when the vehicle is braked, so that the vehicle can be prevented from skidding while the wheels are stopped from rotating, by facilitating the rotation of the wheels when the brake force imparted to the vehicle is removed even in the case where the vehicle is running on a road such as frozen snow-covered one the surface of which represents a low coefficient of friction with respect to the wheels.

3,586,920

INVENTORS
Hisato Wakamatsu
Noriyoshi Ando
BY Cushman, Darby & Cushman
ATTORNEYS

AUTOMOBILE CLUTCH DISENGAGING APPARATUS

BACKGROUND OF THE INVENTION

1. Field of the Invention

This invention generally relates to an automobile clutch disengaging apparatus, and more particularly it pertains to an automobile clutch disengaging apparatus adapted to disengage the clutch to cut off the connection between the wheels and the engine upon cessation of the engine when the wheels are stopped from rotating by imparting a slight brake force to the vehicle while running on a road, such as frozen snow-covered one, the surface of which represents a low coefficient of friction with respect to the wheels, wherein the clutch is maintained in the disengaged state until the engaging operation is performed by the driver, thereby facilitating the rotation of the wheels when the brake force imparted to the wheels is relieved.

2. Description of the Prior Art

Conventionally, it has been the usual practice to disengage the clutch in an attempt to brake a vehicle in order to stop the latter. In such case, however, since quick braking is required, there is not sufficient time to disengage the clutch, and therefore the braking of the vehicle is effected while the clutch is engaged. With such arrangement, if the wheels are stopped from rotation under the influence of the coefficient of friction between the wheels and the road surface and the braking force, then the engine is also choked down and stopped. Disadvantageously, therefore, it is not possible for the driver to accelerate the vehicle until the engine is started again by means of another drive source, in an attempt to accelerate the vehicle by relieving the braking force imparted to the vehicle. Such drawback becomes more remarkable under such a condition that the vehicle is running on a road such as a frozen snow-covered one the surface of which represents an extremely low coefficient of friction with respect to the wheels. That is, the wheels tend to be stopped from rotating by only a slight brake force in case the vehicle is running on a frozen snow-covered road, and the engine is also stopped at the same time. In such case, if the clutch is in the engaged state, then because of the heavy drag of the stopped engine, the wheels fail to be rotated upon release of the brake. Therefore, the vehicle tends to skid while the wheels are stopped from rotation. Obviously, this may cause steering failure, irregular turning of the vehicle or the like which may lead to a disastrous accident.

SUMMARY OF THE INVENTION

It is an object of the present invention to provide an automobile clutch disengaging apparatus comprising a first switch means adapted to be opened and closed in accordance with a lubricating oil pressure in the engine, a brake switch adapted to be opened and closed by the operation of a brake means, a second switch means adapted to be operated upon closure of said brake switch and said first switch means to permit power supply to a clutch disengaging solenoid, a holding circuit adapted to be operated upon closure of said second switch means to hold the latter in the closed state, and a third switch means for forcibly stopping the operation of said holding circuit, said second switch means including a self-holding circuit which is established by the fact that a current is caused to flow through said clutch disengaging solenoid.

In accordance with the present invention, it is possible to facilitate the initial rotation of the wheels when the brake force imparted to the vehicle is eliminated, by maintaining the clutch in the disengaged state until the third switch means is rendered operative, by energizing the clutch disengaging solenoid in case the engine is stopped as the result of the wheels being stopped from rotation while the brake force is being imparted to the vehicle. Without this invention, the wheels are not rerotated even if the brake force imparted to the vehicle is reduced after the engine has stopped as the result of the wheels having been stopped from rotating by that brake force. Providing for wheel rerotation while the engine is stopped such a great advantage that the vehicle can be prevented from skidding.

Other objects, features and advantages of the present invention will become apparent from the following description taken in conjunction with the accompanying drawings.

DESCRIPTION OF THE PREFERRED EMBODIMENTS

Figure 1:
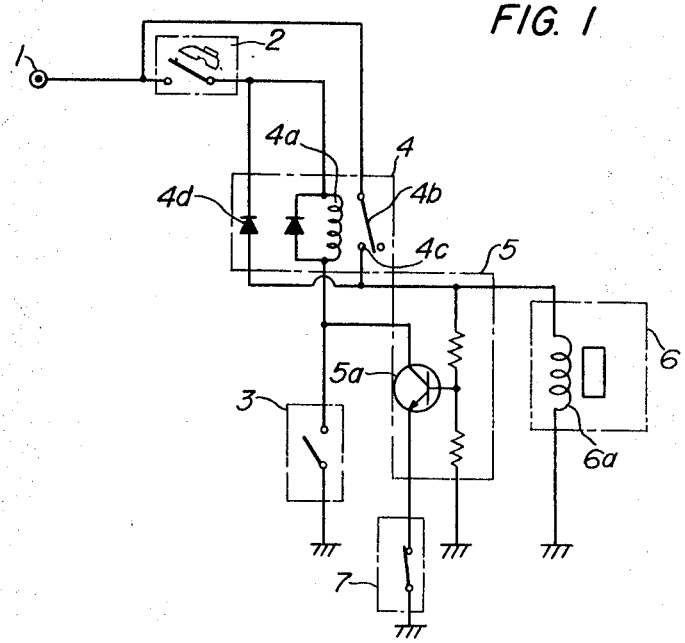
FIGS. 1 and 2 are circuit diagrams showing the automobile clutch disengaging devices according to a first and a second embodiment of the present invention, respectively.

The present invention will now be described with respect to the embodiments shown in the drawings.

Referring first to FIG. 1, numeral 1 represents a terminal to be connected with the positive electrode of a power source battery installed in a vehicle (not shown), 2 a brake switch which is adapted to be closed in interlocking relationship with a brake device when the vehicle is braked, and 3 a first switch means which is adapted to be opened and closed in accordance with the pressure of the lubricating oil of the engine. Numeral 4 indicates a second switch means including an excitation coil 4a, movable contact 4b which is driven by means of the excitation coil 4a, fixed contact 4c provided in opposing relationship to the movable contact 4b and diode 4d. Numeral 5 denotes a holding circuit comprising a transistor 5a and which is so designed as to keep passing a current through the excitation coil 4a by virtue of the conduction of the transistor 5a even after the first switch means 3 has been reopened by a sufficient increase in oil pressure. Numeral 6 represents a clutch disengaging solenoid comprising an excitation coil 6a and which is adapted to disengage the clutch by passing a current through the excitation coil 6a. Numeral 7 denotes a third switch means for forcibly stopping the operation of the aforementioned holding circuit 5 and which may be constituted by a normally closed pushbutton-type type switch.

Description will now be made of the operation of the device having the foregoing arrangement. In an attempt to drive a vehicle slowly without intending to stop it while running on a road such as a frozen snow-covered road the surface of which represents a low coefficient of friction with respect to the wheels of the vehicle, if the driver brakes the vehicle without disengaging the clutch, then the wheels will be stopped from rotating by only a slight braking force due to the fact that the coefficient of friction of the road surface with respect to wheels is low as described above. As a result, the engine will also be stopped. In that case, the lubricating oil pressure in the engine is reduced so that the first switch means 3 is closed. At this point, a current is caused to flow through the excitation coil 4a of the second switch means 4, since the brake switch 2 has already been closed by the braking operation. Consequently, the movable contact 4b is brought into contact with the fixed contact 4c by an electromagnetic attraction force produced by the excitation coil 4a. Thus, a current is passed to the excitation coil 6a of the clutch disengaging solenoid 6 through the two contacts 4b and 4c which are engaged with each other, whereby the clutch is disengaged. If the wheels are stopped from rotating, then the driver will instantly try to rotate them by relieving the braking force imparted thereto. Thus, the brake switch 2 is opened, but at this point a self-controlling circuit is established wherein part of the current flowing through the excitation coil 6a of the clutch disengaging solenoid 6 is made to flow through the diode 4d and relay coil 4a to ground the movable contact 4b of the second switch means 4 was previously brought into engagement with the fixed contact 4c thereof because of the aforementioned operation. Thus, it is possible to maintain the clutch in the disengaged state. Upon disengagement of the clutch, the lubricating oil pressure begins building up gradually, whether the engine was actually stopped and restarted, or even if it was not actually "killed" before clutch disengagement so that the first switch means 3 is opened. At this time, the current flowing through the excitation coil 4a is kept flowing to the ground through the transistor 5a of the holding circuit 5 even after the first switch means 3 has been opened, since a base current is supplied to the transistor 5a through the engagement of the movable contact 4b with the fixed contact 4c so that the transistor is rendered conductive. Therefore, the second switch means 4 is maintained in the closed state. Thus, it is possible to facilitate the driving of the wheels when the brake force being imparted to the vehicle is removed, by automatically disengaging the clutch after or just before the engine is stopped. In an attempt to reaccelerate the vehicle subsequent to the low-speed drive or stands-still, the driver will temporarily open the third switch means 7 to break off the circuit through which power is supplied to the excitation coil 4a of the second switch means 4 thereby interrupting the power supply to the clutch disengaging solenoid 6 and then reengage the clutch. By doing so, it is possible to easily accelerate the vehicle.

Figure 2:
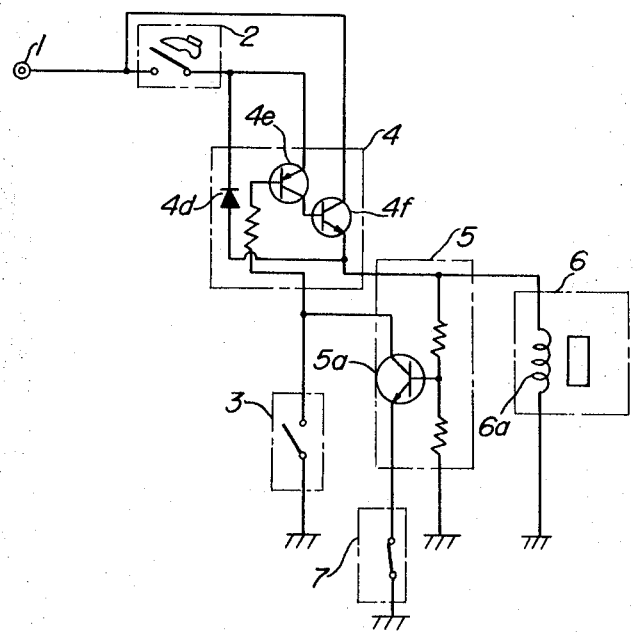

In the aforementioned embodiment, the second switch means 4 was constituted by a relay. However, it is also possible to perform similar operation by constituting the second switch means 4 by a combination of two transistors 4e and 4f as shown in FIG. 2. In this case, the transistors 4e and 4f are rendered conductive upon closure of the brake switch 2 and first switch means 3, so that the collector current of the transistor 4f is made to flow through the clutch disengaging solenoid 6a so that the clutch is thereby disengaged. At the same time, there is established a self-holding circuit wherein part of the collector current is made to pass to the collector of the transistor 4e through the diode 4d.

We claim:

1. A clutch disengaging apparatus for use in a wheeled motor vehicle having an engine lubricated by lubricating oil, brake means and a clutch for engaging and disengaging the wheels of said vehicle with said engine, said apparatus comprising:
   first switch means constructed to be opened and closed in accordance with the pressure of said lubricating oil in the engine,
   a brake switch connnected with said first switch means and constructed to be opened and closed by the operation of said brake means,
   second switch means connected in circuit with said first switch means and said brake switch and arranged to be closed upon closure of said brake switch and said first switch means,
   a solenoid connected with said second switch means for disengaging said clutch from said engine upon the clutch from said engine upon the closure of said second switch means,
   holding circuit means connected with said first switch means, for maintaining the closure of said second switch means after said second switch means has been once closed even after said first switch means is opened, and
   third switch means, connected in series with said holding circuit means, for discontinuing the operation of said holding circuit means,
   said second switch means including a self-holding circuit for maintaining the closure of said second switch means even after said brake switch has been opened.

2. Apparatus as in claim 1 wherein said first switch means is constructed to be closed when the pressure of said oil decreases substantially to the level caused by at least near stoppage of said engine.

3. Apparatus as in claim 1, wherein said second switch means comprises:
   a first transistor connected in series with said solenoid to said power source for switching the power supply to said solenoid, and
   a second transistor connected in circuit with said first transistor for controlling the switching operation of said first transistor in response to the operation of said brake switch and first switch means.

4. An automobile clutch disengaging apparatus for use with a motor vehicle having an engine and braking system, comprising:
   first switch means constructed to be opened and closed respectively in response to starting and stopping of said engine,
   a brake switch constructed to be opened and closed in accordance with the operation of said braking system,
   second switch means connected with said first switch means and said brake switch and having an opening and closing element which is closed by closure of said first switch means and said brake switch, a clutch disengaging solenoid connected to said opening and closing element of said second switch means,
   a holding circuit connected with said first switch means and operative by sensing a current flowing through said solenoid to hold said element of said second switch means closed even if said first switch means opens, and
   actuatable third switch means connected with said holding circuit to release the holding of said holding circuit when actuated, said second switch means being arranged to supply an output signal thereof to the input side thereof to hold said opening and closing element closed even if said brake switch is opened and until said third switch means is actuated.

5. Apparatus as in claim 4, wherein said second switch means comprises a first transistor and a second transistor which is made conductive by said first transistor, and the output side of said second transistor is connected to the input side of said first transistor.

6. Apparatus as in claim 1, wherein said first switch means is opened and closed by lubricating oil pressure in the engine.